UNITED STATES PATENT OFFICE.

JOSEPH VAN RUYMBEKE, OF CHICAGO, ILLINOIS, ASSIGNOR, BY DIRECT AND MESNE ASSIGNMENTS, TO THE NATIONAL CHEMICAL AND FERTILIZER COMPANY, OF SAME PLACE.

ANILINE TAR.

SPECIFICATION forming part of Letters Patent No. 372,243, dated October 25, 1887.

Application filed August 17, 1885. Serial No. 174,589. (No specimens.)

*To all whom it may concern:*

Be it known that I, JOSEPH VAN RUYMBEKE, a citizen of Belgium, residing at Chicago, in the county of Cook and State of Illinois, have invented certain new and useful Improvements in Obtaining Aniline Tars from Concentrated Tank-Waters, which are fully set forth in the following specification.

Tank-waters are the liquids obtained from rendering-tanks, which I first concentrate at a temperature averaging 212° Fahrenheit to about one-eighth of their bulk, and then separate into three distinct portions by distillation at a temperature of from 350° to 500° Fahrenheit. The portion remaining in the retort is suitable for a fertilizer, for which I have obtained a patent, No. 341,963, dated May 18, 1886. The more volatile portion is the subject of my application for a patent, Serial No. 172,842, filed July 27, 1885, and that part of the substances driven off by heat, and which condenses before reaching the gas-holders, as in the hydraulic mains of ordinary gas-works, is the subject of this present application.

When aniline dyes were first made, they were obtained from the aniline contained in coal-tar produced by the destructive distillation of bituminous coal; but after various experiments it was discovered that the amount of aniline which coal-tar contained was so small that the direct production therefrom of aniline dyes was not profitable, and was abandoned in consequence. Ultimately a process was discovered whereby the benzine contained in coal-tar could be converted into aniline and the dyes made therefrom; but this necessitates a duplex process of manufacture, attended with extra expenses.

Aniline is an amide not existing in the hydrocarbon benzine, and therefore in order to produce aniline from benzine the element nitrogen must be added thereto, which is done by the action of nitric acid and subsequent reduction of the nitro-benzine by nascent hydrogen.

So far as is known, coal is a product chiefly derived from cellulose and vasculose, which are hydrates of carbon that have lost their oxygen and hydrogen, with a small proportion of carbon. Coal therefore consists, principally, of carbon, mineral ashes, a reduced proportion of oxygen and hydrogen, and only a mere trace of nitrogen. Tars made from this material, whether distilled at a high or low temperature, contain not to exceed about one per cent. of nitrogen, and will yield less than one-half per cent. of salts of alkaloids, and as nitrogen is an essential element in the constitution of amides their production from coal-tar must necessarily be very limited and expensive. Such tars, when subjected to a redistillation, even at a temperature of less than 500° Fahrenheit, produce a residue which, when cold, becomes solid, but does not contain any nitrogen; nor can it be made available for coloring purposes.

The aniline tars which constitute my present discovery are produced from nitrogenous animal substances, which are mainly albumen, fibrine, musculine, gelatine, chondrine, and osseine, submitted to a temperature not exceeding about 500° Fahrenheit. These tars contain as much as seven to eight per cent. of nitrogen, and yield from fifteen to twenty per cent. of salts of amides, and when subjected to a redistillation at a temperature not exceeding 500° Fahrenheit will yield a residue which, when cold, becomes solid, contains from fifteen to twenty per cent. of ammonia, is available for coloring purposes, and forms a rich fertilizer which is soluble in the soil.

From these tars are readily separated by the addition of fifty per cent. of acid, (preferably mineral,) washing the compound in water, in which the salts of amides will dissolve, but are purified by filtration and crystallized by evaporation, the crystals forming the raw material from which colors are produced. After extracting the salts of amides the residue remaining is rich in phenols, which can be extracted by adding alkali and then washing with water, crystallizing by evaporation, decomposing the crystals by acid and distillation of the product. This operation can be done before or after the treatment for amides.

What I claim is—

As a new article of manufacture, tar obtained from concentrated tank-waters containing about seven per cent. of nitrogen, and adapted for the direct production of aniline by treatment with acid in the usual way.

JOSEPH VAN RUYMBEKE.

Witnesses:
DANIEL BREED,
WM. F. JOBBINS.